United States Patent
Itoh et al.

(10) Patent No.: US 8,330,842 B2
(45) Date of Patent: Dec. 11, 2012

(54) AMPLIFIER CONTROL DEVICE AND RECORDING NON-TRANSITORY MEDIUM

(75) Inventors: Takashi Itoh, Hamura (JP); Hiroyuki Nakata, Musashimurayama (JP); Motoyuki Kashiwagi, Kodaira (JP)

(73) Assignee: Casio Computer Co., Ltd., Tokyo (JP)

( * ) Notice: Subject to any disclaimer, the term of this patent is extended or adjusted under 35 U.S.C. 154(b) by 301 days.

(21) Appl. No.: 12/774,166

(22) Filed: May 5, 2010

(65) Prior Publication Data
US 2010/0321549 A1 Dec. 23, 2010

(30) Foreign Application Priority Data
Jun. 18, 2009 (JP) ................................. 2009-145893

(51) Int. Cl.
*H04N 3/14* (2006.01)
*H04N 5/217* (2006.01)
*H04N 9/64* (2006.01)

(52) U.S. Cl. ........ 348/300; 348/312; 348/241; 348/294; 348/251

(58) Field of Classification Search ............... 348/245, 348/241, 243, 294, 302, 308, 311, 312, 300, 348/251
See application file for complete search history.

(56) References Cited

U.S. PATENT DOCUMENTS
7,236,192 B2 * 6/2007 Kakumoto et al. ........ 348/229.1

FOREIGN PATENT DOCUMENTS
JP 10-262919 A 10/1998
JP 2005-229292 A 8/2005
JP 2008-147991 A 6/2008

OTHER PUBLICATIONS
Japanese Office Action dated Apr. 12, 2011 (and English translation thereof) in counterpart Japanese Application No. 2009-145893.

* cited by examiner

*Primary Examiner* — Nhan T Tran
*Assistant Examiner* — Marly Camargo
(74) *Attorney, Agent, or Firm* — Holtz, Holtz, Goodman & Chick, PC

(57) ABSTRACT

An amplifier control device controls an amplifier which amplifies a first signal supplied from an image-pickup element, and supplies a second signal acquired by amplification of the first signal to a signal processing unit which is a following stage. The amplifier control device comprises a control unit which changes a current supplied to the amplifier depending on whether or not the first signal supplied to the amplifier is used for image data.

10 Claims, 7 Drawing Sheets

501  502

601  602

AMPLIFIER CONTROL DEVICE AND RECORDING NON-TRANSITORY MEDIUM

CROSS-REFERENCE TO RELATED APPLICATION

This application claims the benefit of Japanese Patent Application No. 2009-145893, filed Jun. 18, 2009, the entire disclosure of which is incorporated by reference herein.

FIELD

The present invention relates to an amplifier control device and a recording non-transitory medium storing an amplifier control program.

BACKGROUND

For example, Unexamined Japanese Patent Application KOKAI Publication No. 2005-229292 (hereinafter, patent literature 1) discloses a technology of reducing a current of an emitter-follower circuit which supplies an image-pickup signal from a CCD (Charge Coupled Device) image sensor to a signal processing circuit when a digital camera is picking up a motion image with a dark scene. Patent literature 1 also discloses that the power consumption of the digital camera (the power consumption of the emitter-follower circuit) is thus reduced by this technology when the digital camera is picking up a motion image with a dark scene.

According to the technology disclosed in patent literature 1, however, it is unable to reduce the power consumption of the digital camera when the digital camera picks up an image of a bright scene. Therefore, according to the technology disclosed in patent literature 1, reduction of the power consumption is not accomplished depending on a scene to be shot. Thus, the technology disclosed in patent literature 1 is unable to continuously reduce the power consumption of the emitter-follower circuit. In order to continuously reduce the power consumption of the emitter-follower circuit, it is desirable to reduce the power consumption of the emitter-follower circuit regardless of a scene to be shot. It is general that the same is true for a technology which controls an amplifier (the emitter-follower circuit in patent literature 1) converting a signal supplied from an image-pickup element (the CCD image sensor in patent literature 1).

SUMMARY

The present invention has been made in view of the foregoing circumstance, and it is an object of the present invention to provide an amplifier control device and a recording non-transitory medium storing an amplifier control program which can continuously reduce the power consumption of an amplifier.

An amplifier control device according to a first aspect of the present invention controls an amplifier that amplifies a first signal supplied from an image-pickup element and which supplies a second signal acquired by amplification of the first signal to a following-stage signal processing circuit, the amplifier control device comprising: a control unit which changes a current supplied to the amplifier depending on whether or not the first signal supplied to the amplifier is used for image data.

A recording non-transitory medium according to a second aspect of the present invention stores a program, the program allows a computer that controls an amplifier which amplifies a first signal supplied from an image-pickup element and which supplies a second signal acquired by amplification of the first signal to a following-stage signal processing circuit to execute: a process of changing a current supplied to the amplifier depending on whether or not the first signal supplied to the amplifier is used for image data.

According to the amplifier control device and the recording non-transitory medium storing the amplifier control program of the present invention, it becomes possible to control an amplifier so as to continuously reduce the power consumption thereof.

BRIEF DESCRIPTION OF THE DRAWINGS

A more complete understanding of this application can be obtained when the following detailed description is considered in conjunction with the following drawings, in which.

DETAILED DESCRIPTION

An explanation will be given of an embodiment of the present invention with reference to the accompanying drawings. The present invention is not limited to the embodiment explained below and the drawings. It should be understood that the following embodiment and drawings can be changed and modified (addition, changing or deletion of a structural element) without departing from the scope and spirit of the present invention. In the following explanation, the explanation for technological terms conventionally well known and not important in the embodiment of the present invention will be omitted in order to facilitate understanding.

In the embodiment, an explanation will be given of an example case in which an amplifier control device is a digital camera (may be a computer). However, the amplifier control device of the present invention can be any device which controls an amplifier amplifying a first signal supplied from an image-pickup element (e.g., solid-state image-pickup element) and supplying a second signal acquired by amplification of the first signal to a following signal processing unit.

Figure 1:
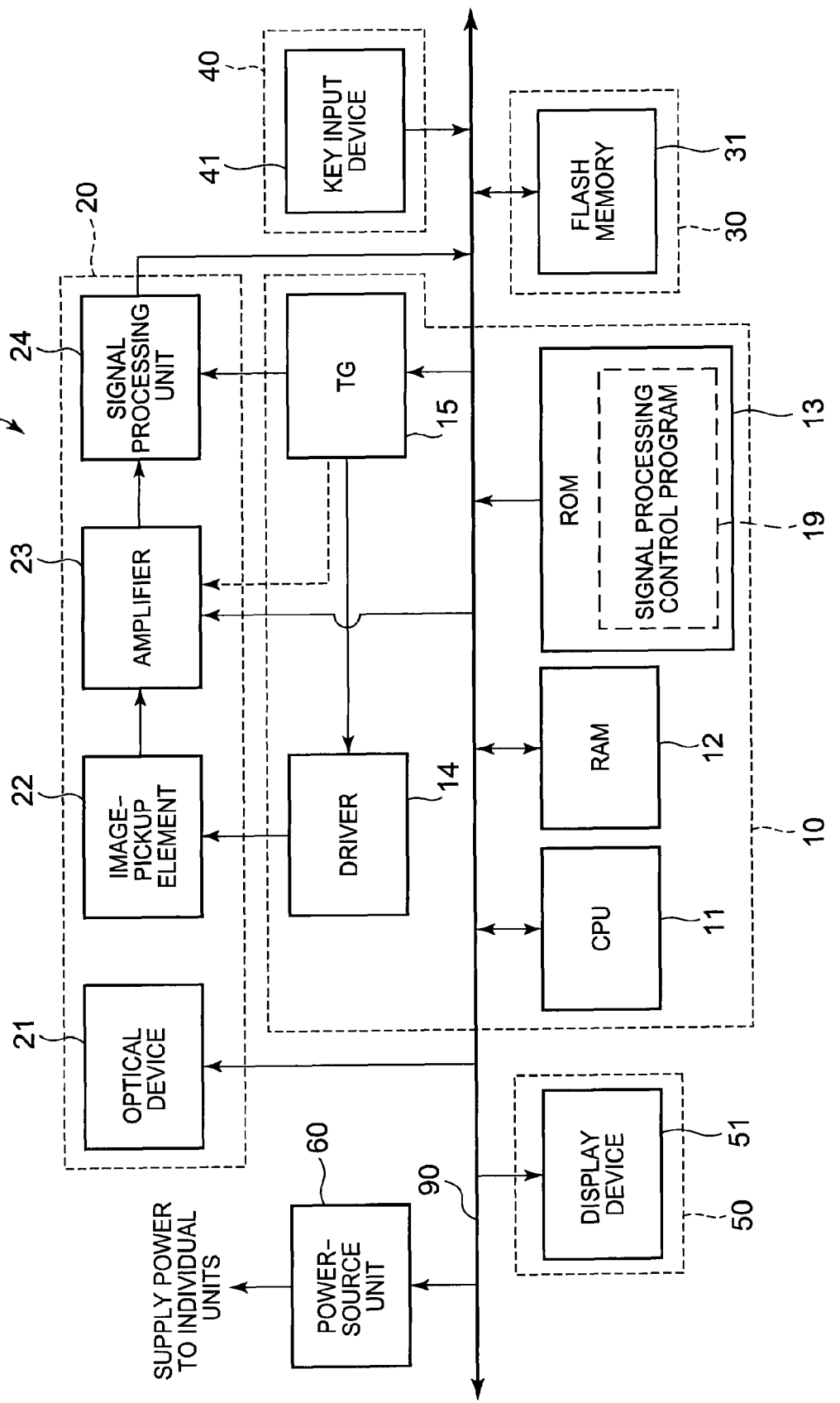
FIG. 1 is a block diagram showing a schematic configuration of an amplifier control device according to an embodiment of the present invention.

As shown in FIG. 1, an amplifier control device 1 of the embodiment includes a control unit 10, an image-pickup unit 20, a memory unit 30, an input unit 40, a display unit 50, and a power-source unit 60. Note that at least a part of individual units and individual devices configuring the amplifier control device 1 is arbitrarily synchronized one another by a clock generator including a clock source like a crystal oscillator.

The control unit 10 controls individual structural elements of the amplifier control device 1 in order to realize functions of the digital camera. In particular, the control unit 10 controls an amplifier 23 so as to control a current supplied from the power-source unit 60 to the amplifier 23.

The control unit 10 includes a CPU (Central Processing Unit) 11, a RAM (Random Access Memory) 12, a ROM (Read Only Memory) 13, a driver 14, and a TG (Timing Generator) 15.

The ROM 13 comprises an arbitrary semiconductor memory device. The ROM 13 stores programs like a signal processing control program 19, and data used by the CPU 11. Those programs and data are directly read out by the CPU 11 or once extracted (recorded) in the RAM 12. Note that the ROM 13 can be replaced with another auxiliary memory device which is rewritable.

The RAM 12 comprises an arbitrary semiconductor memory device. Data to be supplied to the CPU 11 is supplied to the CPU 11 through the RAM 12. The RAM 12 has a work area for the CPU 11. The RAM 12 stores data processed by the CPU 11 (e.g., control data). The CPU 11 arbitrarily supplies data to another structural element through the RAM 12.

The CPU 11 is an essential part of the control unit 10, and controls individual structural elements of the amplifier control device 1. The CPU 11 generates control data for controlling individual structural elements, and supplies the generated control data to individual structural elements through the RAM 12. The CPU 11 causes (controls) individual structural elements to operate by supplying the control data. The CPU 11 operates (executes various processes) in accordance with the program stored in the RAM 12 or the ROM 13. In particular, in accordance with the signal processing control program 19, the CPU 11 controls a current supplied form the power-source unit 60 to the amplifier 23. Moreover, the CPU 11 executes various processes using data stored in the RAM 12 or the ROM 13.

The TG 15 generates a pulse signal for operating a driver 14, and a pulse signal for operating a signal processing unit 24, and supplies the generated pulse signals to the driver 14 and the signal processing unit 24, respectively. Through the supply of such pulse signals, the TG 15 synchronizes the operation timing of the driver 14 (i.e., the operation timing of an image-pickup element 22) with the operation timing of the signal processing unit 24. That is, the operation timing of the driver 14 and that of the signal processing unit 24 are controlled by the CPU 11 through the TG 15. Note that the amplifier 23 is controlled by the CPU 11, but may be controlled through the TG 15 (see dotted arrow in FIG. 1).

The driver 14 is a drive circuit which operates the image-pickup element 22. The driver 14 operates the image-pickup element 22 in accordance with a pulse signal from the TG 15.

As explained above, the CPU 11 controls individual structural elements of the amplifier control device 1 (depending on an occasion, controls those elements through the TG 15 or through the TG 15 and the driver 14). That is, the control unit 10 controls individual structural elements of the amplifier control device 1.

The image-pickup unit 20 generates an image-pickup signal of an object subjected to image-pickup under the control of the control unit 10. The image-pickup unit 20 generates a digital signal using the generated image-pickup signal. The image-pickup unit 20 supplies the generated digital signal to the control unit 10.

The image-pickup unit 20 includes an optical device 21, the image-pickup element 22, the amplifier 23, and the signal processing unit 24.

The optical device 21 comprises an image-pickup lens, a lens driving unit, and a diaphragm/shutter unit. The optical device 21 forms an image of the object on an exposure face (a face on which photo-sensitive elements are formed) of the image-pickup element 22 using those units.

The image-pickup lens is a lens group including a focus lens and a zoom lens. The plurality of lenses configuring the lens group are each driven by the lens driving unit.

The lens driving unit comprises a motor which moves each of the focus lens and the zoom lens in the lens group in the optical axis direction under the control of the CPU 11, and motor drivers like a focus motor and a zoom motor which drives respective lenses in the lens group.

The diaphragm/shutter unit includes a diaphragm/shutter and a drive circuit. The drive circuit operates the diaphragm/shutter under the control of the CPU 11. The diaphragm/shutter functions as both diaphragm and shutter. The diaphragm is a mechanism which controls an amount of light coming in through an image-pickup lens, and a shutter is a mechanism which control a time how long the image-pickup element 22 is irradiated with light (i.e., a time how long the photo-sensitive elements are caused to receive light). A time how long the image-pickup element 22 is irradiated with light (exposure time) changes depending on the speed (shutter speed) of opening/closing of the shutter. Moreover, the exposure time of the image-pickup element 22 changes depending on the diaphragm and the shutter speed.

The image-pickup element 22 is an interline-transfer-type CCD (Charge Coupled Device) image sensor in the embodiment.

Figure 2:
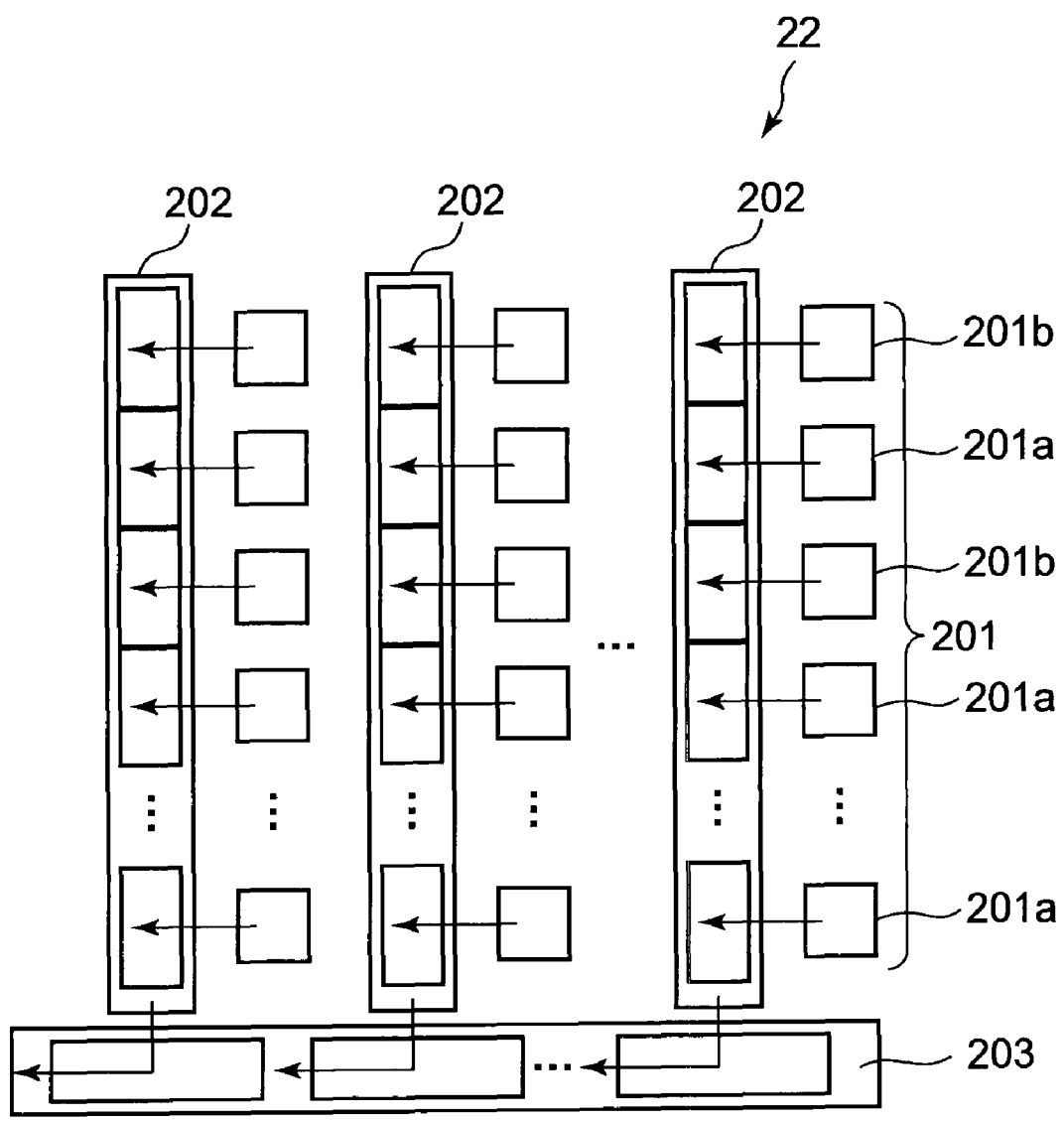
FIG. 2 is a diagram for explaining a schematic configuration of an image-pickup element in the amplifier control device according to the embodiment of the present invention.

As shown in FIG. 2, the interline-transfer-type CCD image sensor (image-pickup element 22) includes photo-sensitive elements (photo diodes or the like) 201, vertical transfer CCDs 202, and a horizontal transfer CCD 203.

The plurality of photo-sensitive elements 201 are arranged correspondingly to pixels (effective pixels and OB (Optical Black) to be discussed later). The plurality of vertical transfer CCDs 202 are arranged correspondingly to vertical lines of the photo-sensitive elements 201 one by one. The horizontal transfer CCD 203 is arranged correspondingly to the plurality of vertical transfer CCDs 202.

The photo-sensitive elements 201 perform photoelectric conversion on receiving light, and accumulate a charge corresponding to the amount of receiving light. The charge accumulated in the photo-sensitive elements 201 is transferred to the vertical transfer CCDs 202 (charge read-out). The charge transferred to the vertical transfer CCDs 202 is subjected to vertical transfer to the horizontal CCD 203. The charge transferred to the horizontal transfer CCD 203 is then subjected to horizontal transfer. The image-pickup element 22 outputs signals (an image-pickup signal and an OB signal to be discussed later) corresponding to the horizontally-transferred charge, and also outputs signals other than those signals. A signal supplied from the image-pickup element 22 to the exterior is called a first signal.

The image-pickup element 22 has a color filter in a Bayer arrangement, and also functions as an electronic shutter. The shutter speed of the electronic shutter is controlled by the CPU 11 through the driver 14 and the TG 15.

The image-pickup element 22 may be another CCD image sensor, such as a full-frame-transfer-type CCD image sensor or a frame-transfer-type CCD image sensor. The full-frame-transfer-type CCD image sensor directly performs photoelectric conversion at each element of vertical transfer CCDs. Moreover, the frame-transfer-type CCD image sensor has light-receiving CCDs and transfer CCDs, and transfers a charge from the light-receiving CCDs to the transfer CCDs during a vertical flyback period. Furthermore, the image-pickup element 22 may be the other image sensors like a CMOS (Complementary Metal Oxide Semiconductor) image sensor.

Figure 3:
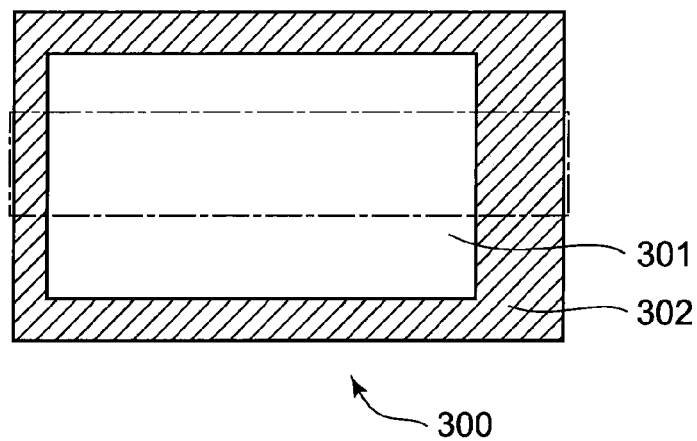
FIG. 3 is a diagram for explaining an exposure face of the image-pickup element in the amplifier control device according to the embodiment of the present invention.

As shown in FIG. 3, an exposure face 300 of the image-pickup element 22 includes an effective pixel area 301 and an OB (Optical Black) area 302 (hatched area). The hatching in FIG. 3 is given to clarify such an area, and does not represent a cross section. The effective pixel area 301 is an area where photo-sensitive elements corresponding to pixels (effective pixels) configuring a picked-up image (an image of the object) are arranged. The OB area 302 is an area where photo-sensitive elements corresponding to pixels (OB) for detecting a black level to be a criterion are arranged. The photo-sensitive elements corresponding to the OB are light-shielded by a light shielding film (e.g., an aluminum film) formed on the exposure faces of the photo-sensitive elements by vapor deposition or the like.

The image-pickup element 22 supplies an image-pickup signal corresponding to a charge accumulated in the photo-sensitive elements of the effective pixel area 301 and an OB signal corresponding to a charge accumulated in the photo-sensitive elements in the OB area 302 through the foregoing successive operations (image-pickup operation) to the amplifier 23 pixel by pixel at a predetermined timing.

The amplifier 23 receives the first signal (in particular, the image-pickup signal and the OB signal) supplied from the image-pickup element 22. The amplifier 23 amplifies the received image-pickup signal to a signal processable by the signal processing unit 24 at the following stage. Note that the signal having undergone amplification by the amplifier 23 is called a second signal. The amplifier 23 supplies the second signal to the signal processing unit 24. The amplifier 23 is controlled by the CPU 11 (the control unit 10). Through such a control, especially a current supplied from the power-source unit 60 to the amplifier 23 is controlled. The amplifier 23 will be explained in detail later. The amplifier 23 also functions as an impedance converter which matches the output of the image-pickup element 22 with the input of the signal processing unit 24.

As explained above, the signal processing unit 24 operates in accordance with the pulse signal from the TG 15. The signal processing unit 24 includes an OB clamp unit, a CDS (Correlated Double Sampling) circuit, an AGC (Automatic Gain Control) circuit, and A/D (Analog/Digital) converter. The signal processing unit 24 is a so-called AFE (Analog Front End).

The OB clamp unit performs sampling on the OB signal amplified by the amplifier 23 (an example of the second signal) at a predetermined point, and detects a black level at the OB. Next, the OB clamp unit adds (clamps) the detected black level to a signal acquired by amplification of the image-pickup signal (a second signal for the image-pickup signal). Accordingly, a signal component by what corresponds to increment of a dark current caused by a temperature rising or the like and superimposed on the image-pickup signal can be cancelled. The OB signal supplies a signal having undergone compensation as a clamped signal to the CDS circuit.

The CDS circuit performs correlated double sampling on the clamped signal supplied from the OB clamp unit, and holds it. The CDS circuit supplies the holding signal having undergone correlated double sampling as a sampled signal to the AGC circuit.

The AGC circuit performs automatic gain adjustment on the sampled signal supplied from the CDS circuit. The AGC circuit supplies the signal having undergone automatic gain adjustment as an adjusted signal to the A/D converter. The gain of the AGC circuit can be controlled through a serial I/O (Input/Output) by the CPU 11.

The A/D converter converts the adjusted signal (an analog signal) supplied from the AGC circuit into a digital signal. The A/D converter supplies the digital signal as image source data (data including pixel values of individual pixels) to the CPU 11.

The memory unit 30 stores image data under the control of the control unit 10. The memory unit 30 temporarily stores some of data to be recorded in the RAM 12 arbitrarily. The memory unit 30 includes a flash memory 31. The flash memory 31 is a memory medium storing image data under the control of the CPU 11, and may be connected to the amplifier control device 1 from the exterior.

The input unit 40 includes a key input device 41, receives an input from a user, and supplies an input signal (input data) corresponding to the received input to the control unit 10 (CPU 11). The control unit 10 (CPU 11) controls individual units (individual devices) in response to the supplied input signal. The key input device 41 includes plural operation keys, such as a shutter button which enables two kinds of operations: halfway pressing; and full pressing, a mode change key, a cross key, a zoom key, and a menu key, and supplies an input signal (input data) corresponding to the key operation by the user to the CPU 11. As the shutter button is fully pressed, input data of instructing a shutter operation is supplied to the CPU 11. Moreover, as the shutter button is pressed halfway, input data of instructing an AF (Auto Focus) mode is supplied to the CPU 11.

The display unit 50 includes a display device 51 like a liquid crystal display device. The display unit 50 displays various images necessary for operating the amplifier control device 1, and a live-view image (finder image) at the time of image-pickup, a picked-up image, and the like. In the embodiment, a picked-up image or the like is displayed based on an image signal (an RGB (Red-Green-Blue) signal) generated by the CPU 11.

The power-source unit 60 supplies power to individual structural elements of the amplifier control device 1 needing power under the control of the control unit 10 (CPU 11). In particular, the power-source unit 60 has a function as a constant-voltage source which supplies power with a constant voltage to the image-pickup element 22 and the amplifier 23. In the embodiment, the power-source unit 60 includes a battery of the digital camera.

A bus 90 is a transmission path which transmits data to be exchanged among individual structural elements connected to the bus 90.

When the display device 51 displays a live-view image, the image-pickup element 22 successively picks up images under the control of the CPU 11 (including a control through the TG 15 and the driver 14). The display device 51 displays a live-view image when, for example, the amplifier control device 1 is powered on and the key input device 41 is not being operated. In this fashion, as the image-pickup element 22 successively picks up images, pieces of the image source data are successively supplied to the CPU 11. The CPU 11 successively performs image processing, such as a gamma compensation process, an interpolation process, a white-balancing process, a histogram generating process, and a generating process of a brightness difference signal (YUV data), on pieces of image source data successively supplied, and successively stores pieces of image data having undergone the process in the RAM 12. The CPU 11 successively generates RGB signals based on pieces of image data stored in the RAM 12, and successively supplies the RGB signals to the display device 51. The display device 51 successively reproduces and displays images represented by image data (images picked up by the image-pickup element 22) using the supplied RGB signals. The display device 51 displays a live-view image in this fashion.

While the display device 51 is displaying a live-view image, as input data of instructing the AF (Auto Focus) mode is supplied from the key input device 41 to the CPU 11, the CPU 11 performs an operation in the AF mode. At this time, the CPU 11 performs auto focusing in a contrast detecting scheme using image data successively recorded in the RAM 12.

While the display device 51 is displaying a live-view image, as input data of instructing a shutter operation is supplied from the key input device 41 to the CPU 11, the CPU 11 performs an image-pickup control (digital image pickup control). At this time, the CPU 11 controls the TG 15 and the driver 14 to set the exposure time of the photo-sensitive elements to be longer than the exposure time when a live-view image is being displayed. As image data using the image-pickup signal based on a charge accumulated during the exposure time is recorded in the RAM 12, the CPU 11 generates an RGB signal based on the image data recorded in the RAM 12, and supplies the generated RGB signal to the display device 51. The display device 51 reproduces and displays an image represented by the image data (an image picked up by the image-pickup element 22) using the supplied RGB signal as an image to be recorded in the flash memory 31. Moreover, the CPU 11 compresses the image data, and records the compressed data in the flash memory 31.

Figure 4:
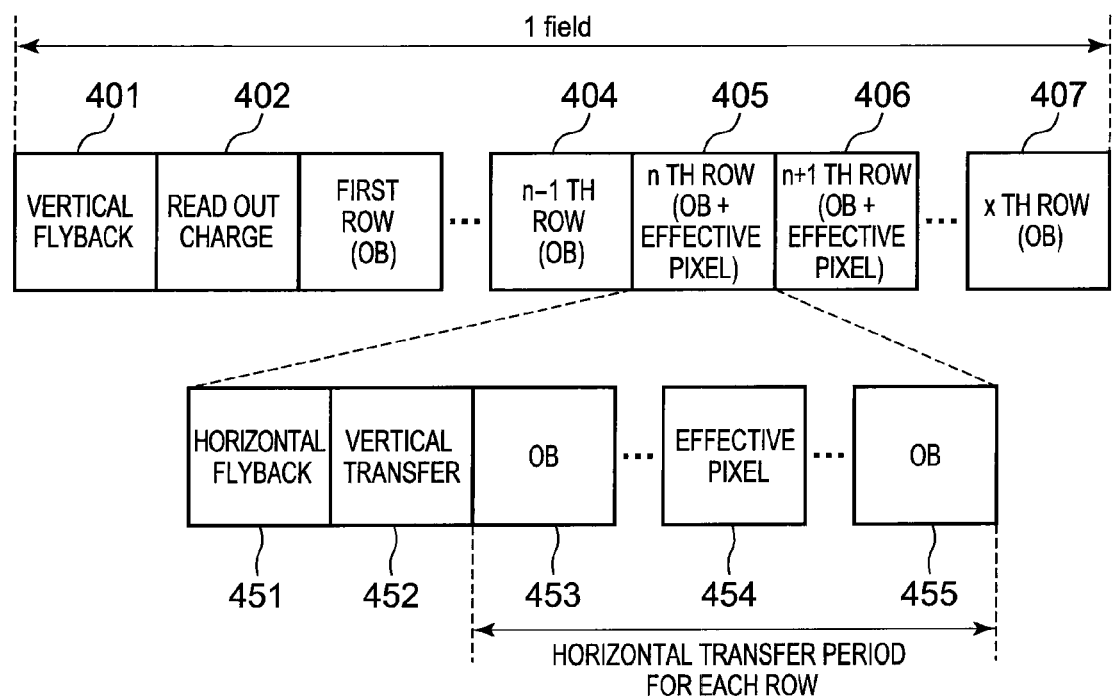
FIG. 4 is a diagram for explaining an operation of the image-pickup element in the amplifier control device according to the embodiment of the present invention.

Next, an explanation will be given of the operation of the image-pickup element 22 with reference to FIGS. 2 to 4. Under the control of the CPU 11, the image-pickup element 22 reads out charges accumulated in the photo-sensitive elements 201a located in odd-numbered rows (in lines side by side) after a predetermined exposure time, and performs vertical transfer, and horizontal transfer (for one field). Next, the image-pickup element 22 reads out charges accumulated in the photo-sensitive elements 201b located in even-numbered rows (in lines side by side), and performs vertical transfer and horizontal transfer (for one field). The image-pickup element 22 successively supplies image-pickup signals based on a charge of each pixel by what corresponds to one flame to the amplifier 23 at a predetermined interval through the foregoing operations for two fields.

The operations of the image-pickup element 22 at individual fields in one flame are same even though the photo-sensitive elements 201 differ filed by field, so that an explanation will be given of the operation of the image-pickup element 22 for one field with reference to FIG. 4.

The image-pickup element 22 basically does not operate during a period of vertical flyback (reference numeral 401). The vertical flyback period is a vertical blanking period. Next, the image-pickup element 22 reads out charges accumulated in photo-sensitive elements 201 in the odd-numbered rows or the even-numbered rows to the vertical transfer CCDs 202 (reference numeral 402). Note that the image-pickup element 22 may read out the charges during the vertical blanking period.

Thereafter, the image-pickup element 22 performs vertical transfer and horizontal transfer on the read-out charges in the vertical transfer CCDs 202 successively for each line side by side (one row). That is, the image-pickup element 22 performs vertical transfer and horizontal transfer for each row from a first row to an x-th row. The kinds of pixels may differ depending on a case, but the operation of the image-pickup element 22 at each row is basically same, so that an explanation will be given of the operation of the image-pickup element 22 at an n-th row. It is assumed that the position of each photo-sensitive element 201 in the n-th row is located at a position of a row within a central range in the vertical direction shown in FIG. 3. As shown in FIG. 4, rows from the first row to an n−1-th row are configured by the OB pixels only, the rows from the n-th row to an x−1-th row are configured by both OB pixels and effective pixels, and the x-th row is configured by the OB pixels only (where n<x). Note that rows within a central range in the vertical direction are rows from the n-th to the x−1-th rows.

The image-pickup element 22 basically does not operate during a period of horizontal flyback (reference numeral 451). The horizontal flyback period is a horizontal blanking period. Next, the image-pickup element 22 performs vertical transfer, shifts charges in individual vertical transfer CCDs 202 one by one toward the horizontal transfer CCD 203 side, and transfers a charge at a row (the lowest row in FIG. 2) closest to the horizontal transfer CCD 203 to the horizontal transfer CCD 203 (reference numeral 452). Thereafter, the image-pickup element 22 performs horizontal transfer, shifts the charge in the horizontal transfer CCD 203 to the external side by what corresponds to one pixel, and transfers a charge closest to the exterior (leftmost charge in FIG. 2) to the exterior. As shown in FIG. 3, plural pixels located at the center of the n-th row become effective pixels, respectively, and plural pixels at both ends become OBs, respectively. Accordingly, as shown in FIG. 4, charges are subjected to horizontal transfer pixel by pixel in the order of individual charges of plural OBs, individual charges of plural effective pixels, and individual charges of plural OBs. During the horizontal transfer period, an OB signal and an image-pickup signal based on the charge for each pixel are output by the image-pickup element 22 pixel by pixel.

Note that as shown in FIG. 3, rows that all pixels in a line side by side are OBs are present at positions across the effective pixel area in the exposure face 300, so that in the OB areas at both sides in the vertical direction, such as the first row to the n−1-th row and the x-th row, all charges become ones accumulated by the photo-sensitive elements 201 at the OB area. In this case, the image-pickup element 22 outputs only OB signal.

When in the AF mode, the CPU 11 performs auto focusing in a contrast detecting scheme using only the central area of the image in the vertical direction (an area surrounded by dashed-dotted lines in FIG. 3). Accordingly, the image-pickup element 22 outputs a signal based on only a charge accumulated in the photo-sensitive element 201 corresponding to the central area in the vertical direction to the amplifier 23 under the control of the CPU 11. Moreover, the image-pickup element 22 discharges the charges accumulated in the photo-sensitive elements corresponding to areas other than the central area in the vertical direction to the exterior through an arbitrarily scheme under the control of the CPU 11. For example, charges from the vertical transfer CCDs 202 are superimposed on the horizontal transfer CCD 203 by repeating vertical transfer and by performing horizontal transfer, and then the horizontal transfer CCD 203 performs horizontal transfer. This allows rapid discharging of unnecessary charges (fast-speed flushing). Note that the image-pickup element 22 supplies a signal (flushed charge signal) based on the discharged charge to the amplifier 23.

As explained above, the image-pickup element 22 supplies the OB signal and the image-pickup signal to the amplifier 23. Moreover, the image-pickup element 22 supplies a signal other than the OB signal and the image-pickup signal (signal without noise and amplitude) to the amplifier 23 during the vertical flyback period and the horizontal flyback period. In the fast-speed flushing, the image-pickup element 22 supplies a signal (flushed charge signal) based on the discharged charge to the amplifier 23. Furthermore, during the exposure time, the image-pickup element 22 supplies a signal other than the OB signal and the image-pickup signal (signal without noise and amplitude) to the amplifier 23. Thus, the image-pickup element 22 is always supplying any signal (the first signal) to the amplifier 23 during its operation. The signal other than the OB signal and the image-pickup signal and the flushed charge signal are ones not used for image data. Even if such signals are amplified, none of those signals is used to acquire a pixel value of each pixel of an image which is a source of image data. That is, the signal not used for image data is a signal which does not contribute to expression (reproduction) of an object image in an image represented by image data.

The amplifier 23 to which the first signal is supplied from the image-pickup element 22 generally has large power consumption. If the power consumption of the amplifier 23 is reduced, the power consumption of the whole digital camera can be greatly reduced. However, if the power consumption of the amplifier 23 is made small, then, the frequency characteristic of the second signal amplified by the amplifier 23 becomes poor. This is caused by the floating capacitance of a transistor in the amplifier 23, the time constant of a capacitor component of the image-pickup element 22, and the like. Note that a change of the power consumption of the amplifier 23 (e.g., reduction) is carried out by, for example, changing the resistance in the amplifier 23 to change (e.g., reduce) a current (e.g., a drive current) supplied to the amplifier 23. The drive current includes, for example, a sink (suctioning) current. Changing of the resistance in the amplifier 23 includes changing of the resistance itself used in the amplifier 23 by switching of a connection, and changing of the resistance value using a variable resistor or the like.

However, if a current supplied to the amplifier 23 is controlled in accordance with the kind of the first signal supplied to the amplifier 23 from the image-pickup element 22, the power consumption can be reduced, and the frequency characteristic is not deteriorated. If the first signal is the signal other than the OB signal and the image-pickup signal, or the flushed charge signal, such signal is not used for image data. Accordingly, if the frequency characteristic is deteriorated when such signal is amplified by the amplifier 23, there is no effect on deterioration of the image quality or such an effect is little. Therefore, when the signal supplied from the image-pickup element 22 is the signal other than the OB signal and the image-pickup signal, or the flushed charge signal, reduction of the power consumption can be accomplished by reducing a current supplied to the amplifier 23.

As explained above, the OB signal is indirectly used for acquisition of pixel values of the effective pixels, but is not directly used for image data. Hence, the OB signal is not data used for image data, too. However, the OB signal amplified by the amplifier 23 is used by the clamp unit of the signal processing unit 24. Accordingly, there is a problem whether or not deterioration of the frequency characteristic of the OB signal caused as a current supplied to the amplifier 23 is reduced when the OB signal is supplied to the amplifier 23 largely affects deterioration of the image quality.

Figure 5:
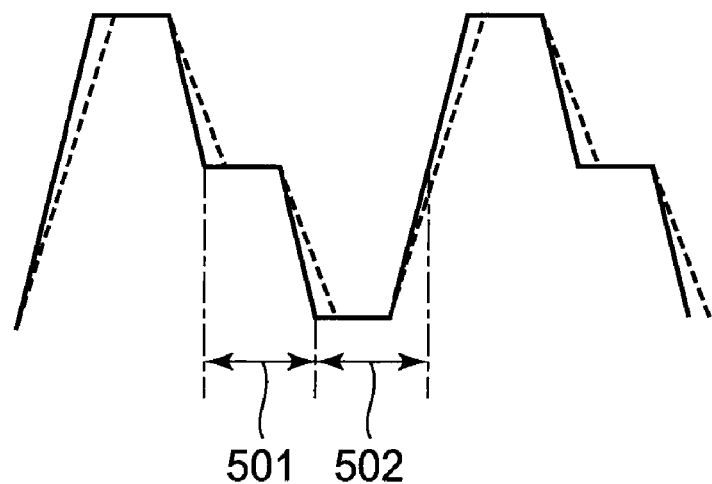
FIG. 5 is a diagram showing an example of a waveform of an image-pickup signal amplified according to the embodiment of the present invention.
Figure 6:
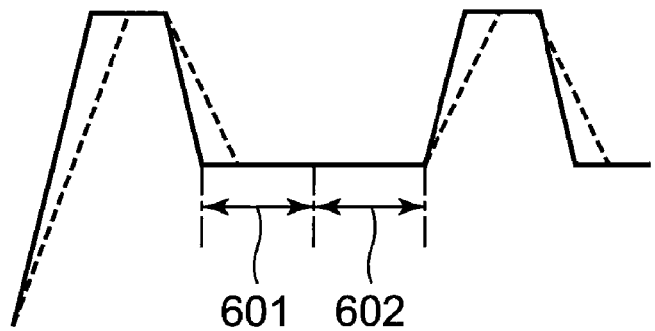
FIG. 6 is a diagram showing an example of a waveform of an OB signal amplified according to the embodiment of the present invention.

FIG. 5 shows a general waveform of the image-pickup signal amplified by the amplifier 23, and FIG. 6 shows a general waveform of the OB signal amplified by the amplifier 23. As shown in FIG. 5, the image-pickup signal amplified by the amplifier 23 has a flat part (a part on which the CDS circuit can perform sampling) during a filed-through period 501 and a flat part (a part on which the CDS circuit can perform sampling) during a signal period 502, and such parts are both short. Accordingly, as the frequency characteristic of the image-pickup signal amplified by the amplifier 23 is deteriorated (see dashed lines in FIG. 5), the flat parts become further short, resulting in difficulty with accurate sampling. This is because a signal value in the field-through period 501 and a signal value in the signal period 502 are subjected to sampling and a pixel value is set based on a difference between the signals having undergone the sampling. Therefore, deterioration of the frequency characteristic of the image-pickup signal amplified by the amplifier 23 results in deterioration of the image quality of image data.

In contrast, as shown in FIG. 6, regarding the OB signal amplified by the amplifier 23, the signal becomes substantially flat during a field-through period 601 and during a signal period 602. Because the OB signal is a signal output by the photo-sensitive element having the light-shielded exposure surface (i.e., a signal representing a black pixel), there is no or little difference between a signal value in the field-through period 601 and a signal value in the signal period 602. Accordingly, a period that the OB clamp unit can perform sampling is long, and if the frequency characteristic of the OB signal amplified by the amplifier 23 is deteriorated (see dashed lines in FIG. 6), sampling is still easy. Therefore, there is no or little effect on deterioration of the image quality due to deterioration of the frequency characteristic of the OB signal originating from reduction of a current supplied to the amplifier 23. Hence, even if a signal supplied from the image-pickup element 22 to the amplifier 23 is the OB signal, it is possible to reduce the power consumption by reducing a current supplied to the amplifier 23. However, it is desirable to design the amplifier 23 so as to reduce a current supplied to the amplifier 23 within a range where sampling is possible.

What it comes down is that even if the frequency characteristic of the first signal which is not used for image data is deteriorated when such a signal is amplified, there is no or little effect on deterioration of the image quality. Accordingly, when the image-pickup element 22 supplies the first signal which is not used for image data to the amplifier 23, it is fine if a current supplied to the amplifier 23 is reduced. This makes it possible to reduce the power consumption. As explained above, it is fine if such a first signal not used for image data includes at least one of the followings: a signal supplied from the image-pickup element 22 during a period of horizontal flyback performed by the image-pickup element 22; a signal supplied from the image-pickup element 22 during a period of vertical flyback performed by the image-pickup element 22; a signal corresponding to the OB; a signal corresponding to a pixel not used for AF; and a signal supplied from the image-pickup element 22 during the exposure time of digital image pickup.

Figure 7:
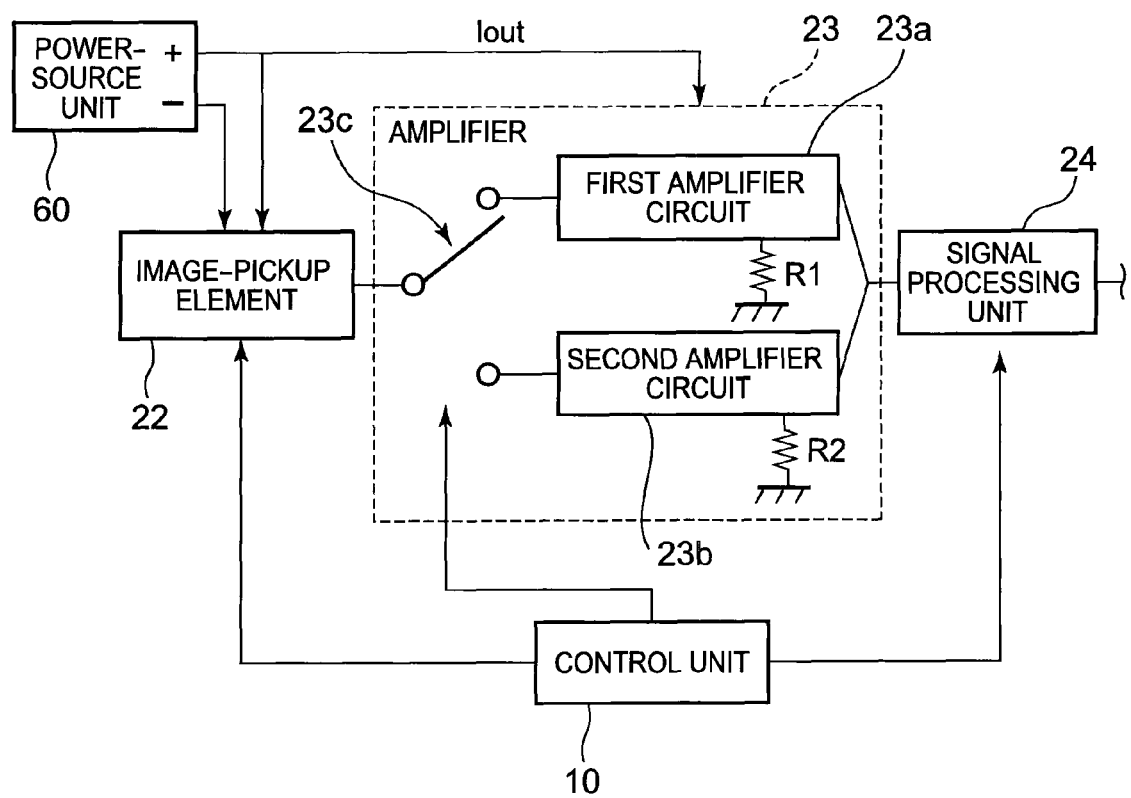
FIG. 7 is a diagram showing a relationship among the image-pickup element, an amplifier, a signal processing unit, a control unit, and a power-source unit in the amplifier control device according to the embodiment of the present invention.

Based on the foregoing fact, an explanation will be given of a control of reducing a current supplied to the amplifier 23. A relation among the image-pickup element 22, the amplifier 23, the signal processing unit 24, the power-source unit 60, and the control unit 10 (CPU 11) will be explained in detail with reference to FIG. 7.

The amplifier 23 includes a first amplifier circuit 23a, a second amplifier circuit 23b, and a switch element 23c. The switch element 23c changes over a circuit connected to the image-pickup element 22 and to the signal processing unit 24 under the control of the control unit 10 (CPU 11). That is, the switch element 23c changes over the wiring connection so that either one of the first amplifier circuit 23a or the second amplifier circuit 23b is connected to the image-pickup element 22 and to the signal processing unit 24. Note that power from the power-source unit 60 is supplied to either one amplifier circuit between the first amplifier circuit 23a and the second amplifier circuit 23b connected to the image-pickup element 22 and the signal processing unit 24. A voltage at the positive side of the power-source unit 60 is, for example, 13 V, and a voltage at the negative side thereof is, for example, −7.5 V. The positive side of the power-source unit 60 is connected to the image-pickup element 22 and the amplifier 23. The negative side of the power-source unit 60 is connected to the image-pickup element 22.

The first amplifier circuit 23a and the second amplifier circuit 23b each has a resistor which is a load against the power-source unit 60. The resistors contribute to, for example, a change in a current supplied to the amplifier 23. The first amplifier circuit 23a and the second amplifier circuit 23b have different resistance values. That is, the first amplifier circuit 23a and the second amplifier circuit 23b have different loads against the power-source unit 60. Because the power-source unit 60 is a constant voltage source, the difference between the load of the first amplifier circuit 23a against the power-source unit 60 and the load of the second amplifier circuit 23b against the power-source unit 60 makes respective currents supplied to the first amplifier circuit 23a and the second amplifier circuit 23b different from each other. If the resistor of the first amplifier circuit 23a is R1 in FIG. 7, the resistor of the second amplifier circuit 23b is R2 in the figure and R1>R2, then, a current Iout supplied to the second amplifier circuit 23b becomes large, so that the power consumption thereof becomes large.

Next, an explanation will be given of an amplifier control process executed by the control unit 10 (CPU 11) to control the amplifier 23 with reference to the flowchart of FIG. 8. This process starts when the amplifier control device 1 is powered on, and ends when a mode is changed or the power is turned off.

The control unit 10 (CPU 11) determines whether or not the first signal supplied from the image-pickup element 22 is data used for image data (step S801). At this time, the control unit 10 is controlling the operation of the image-pickup element 22 and the operation of the signal processing unit 24, and is causing those operations to synchronize with each other. Accordingly, it is possible for the control device 10 to determine whether the first signal is any one of the followings (i.e., the kind of the first signal): a signal supplied from the image-pickup element 22 during a period of horizontal flyback, a signal supplied from the image-pickup element 22 during a period of vertical flyback performed by the image-pickup element 22; a signal corresponding to the OB; a signal corresponding to a pixel not used for AF; a signal supplied from the image-pickup element 22 during the exposure time of a digital image pickup; or none of those. The control unit 10 determines whether or not the first signal is data not used for image data based on the determined kind of the first signal. However, the kind of the first signal determined as data not used for image data by the control unit 10 (step S801: NO) is set beforehand. Because the position of the OB is set beforehand, determination by the control unit 10 whether or not the first signal is the OB signal is carried out based on the order of horizontal transfer instruction by the control unit 10.

When determining that the first signal is data used for image data (step S801: YES), the control unit 10 controls the switch element 23c to connect the second amplifier circuit 23b to the image-pickup element 22 (step S802). Accordingly, the second signal with a good frequency characteristic can be acquired from the amplifier 23 although the power consumption is large.

When determining that the first signal is not data used for image data (step S801: NO), the control unit 10 (CPU 11) controls the switch element 23c to connect the first amplifier circuit 23a to the image-pickup element 22 (step S803). Accordingly, the second signal with a poor frequency characteristic can be acquired from the amplifier 23 although the power consumption is little.

In this fashion, the control unit 10 (CPU 11) controls the amplifier 23, and controls a current supplied to the amplifier 23. Such an amplifier 23 can be realized by, for example, a buffer IC having external resistors with different resistance values connected to CXA3741UR (made by SONY corporation).

As explained above, according to the embodiment, the control unit 10 changes a current supplied to the amplifier 23 in accordance with whether or not the first signal supplied to the amplifier 23 is used for image data. It is possible to continuously reduce the power consumption of the amplifier 23 through the foregoing operation regardless of a scene subjected to image pickup. Equal to or greater than three amplifier circuits may be provided, and the power consumption may be changed step by step according to the amplifier circuit. In this case, the control unit 10 sets how much the power consumption is reduced in accordance with a period that the first signal supplied from the image-pickup element 22 is data not used for image data. This may result in stabilization of the waveform in some cases. In the case of the period of horizontal flyback or the like, i.e., in the case of the short period that the first signal supplied from the image-pickup element 22 is data not used for image data, it is desirable to control (switch) the switch element 23c at a timing which takes account of the responsiveness of the operation of the signal processing unit 24 due to a change in the output waveform (a period until the operation becomes stable after the drive current or the like is changed). In this case, a stability time is measured beforehand, and the control timing is set beforehand. This may result in stabilization of the waveform in some cases. Moreover, it is necessary to design the amplifier 23 so as to reduce a current supplied thereto within a range where sampling is possible. Furthermore, when determining that the signal corresponding to the OB is data not used for image data, the control unit 10 controls the OB clamp unit to change a timing of performing sampling to a timing which enables good sampling.

As explained above, according to the embodiment, the control unit 10 controls the amplifier 23 in such a way that a current supplied to the amplifier 23 when the first signal is not used for image data becomes smaller than a current when the first signal is used for image data. This eliminates or reduces the effect on deterioration of the image quality and enables reduction of the power consumption.

Moreover, as explained above, according to the embodiment, the control unit 10 controls the image-pickup element 22 to control the timing that the image-pickup element 22 supplies the first signal which is not used for image data, and a current supplied to the amplifier 23 is changed in accordance with such timing. Hence, a current supplied to the amplifier 23 can be changed at an appropriate timing.

Furthermore, as explained above, according to the embodiment, the control unit 10 changes the resistance values of the resistors possessed by the amplifier 23 to change a current. Accordingly, even though the power-source unit 60 is a constant voltage source, the current can be changed. Depending on how much the resistance value is changed, the time constant of a capacitor component of the image-pickup element 22 may change, and the frequency characteristic of the amplified second signal may be deteriorated, but this problem can be overcome as explained above.

Still further, as explained above, according to the embodiment, the amplifier 23 comprises plural amplifier circuits 23a, 23b to which different currents are supplied, respectively. The control unit 10 connects one of the plurality of amplifiers 23a, 23b to the image-pickup element 22 depending on whether or not the first signal supplied to the amplifier 23 is used for image data, thereby changing a current supplied to the amplifier 23. As a current supplied to the amplifier 23 is controlled by changing over the plurality of circuits, the start-up of the operation of the amplifier 23 at the time of changing over the circuit becomes good.

Note that the amplifier 23 may have a single circuit, but the control unit 10 may change over the connection to resistors in such a circuit so as to change the resistance value of the amplifier 23.

Figure 9:
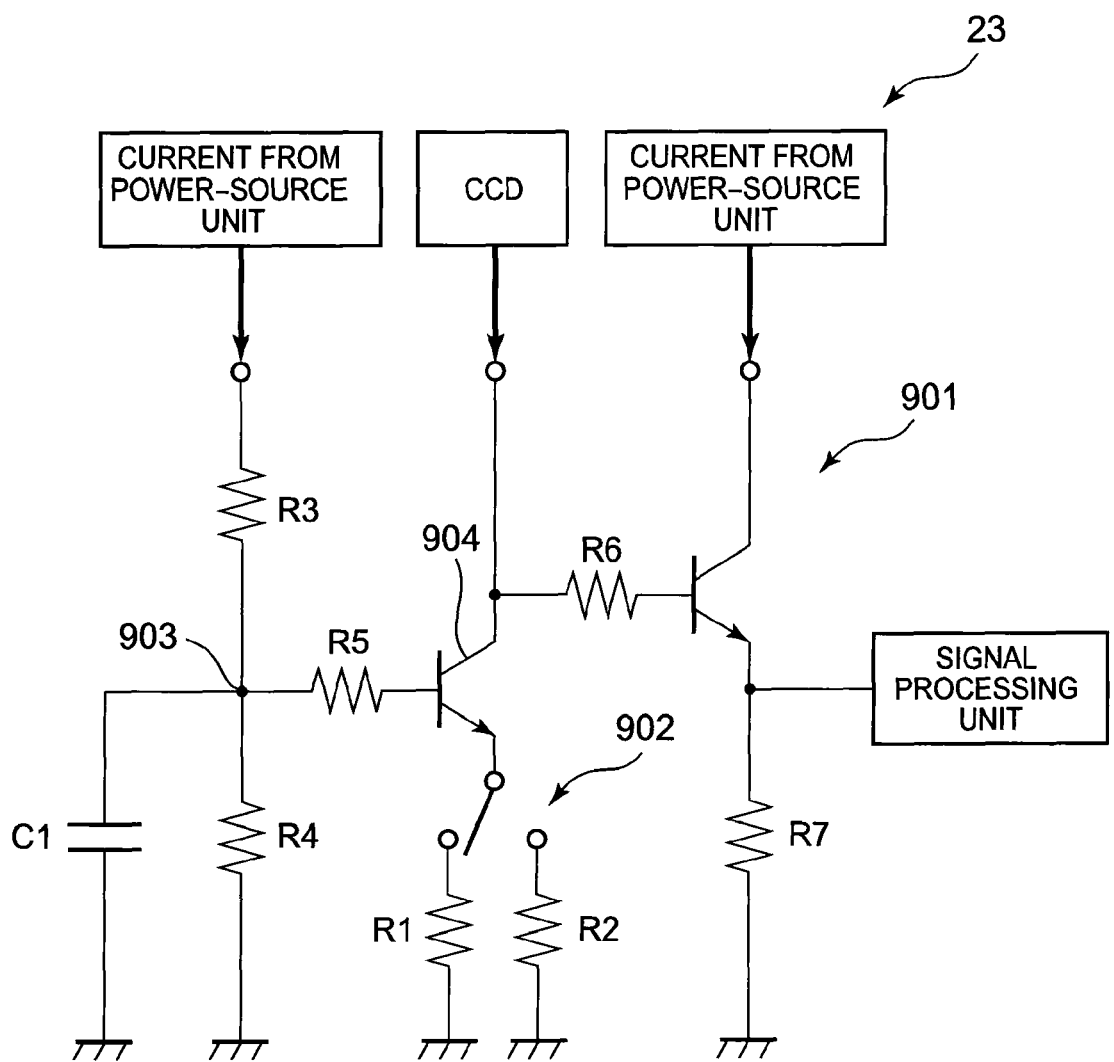
FIG. 9 is a diagram showing another example of an amplifier in the amplifier control device according to the embodiment of the present invention.

This configuration will be explained with reference to FIG. 9. As shown in FIG. 9, the amplifier 23 includes an emitter-follower circuit 901. The amplifier 23 also includes a switch element 902, and a connection between a transistor 904 and a resistor is changed over between R1 and R2. Values of individual elements are, for example, R1=3 k$\Omega$, R2=1.3 k$\Omega$, R3=18 k$\Omega$, R4=8.2 k$\Omega$, R5=100$\Omega$, R6=47$\Omega$, R7=1.2 k$\Omega$, and C1=0.1 $\mu$F.

The power-source unit 60 applies a constant voltage to the amplifier 23. The potential at a point 903 is divided by R3 and R4. Moreover, C1 is charged by a current from the power-source unit 60. Accordingly, the potential at the point 903 becomes a constant potential. When the control unit 10 switches the switch element 902, the base-collector current of the transistor 904 changes. Accordingly, a supplied current to the amplifier 23 is thus changed. Because R1>R2, a supplied current becomes larger when it is connected to the resistor R2, and the power consumption becomes larger.

Figure 8:
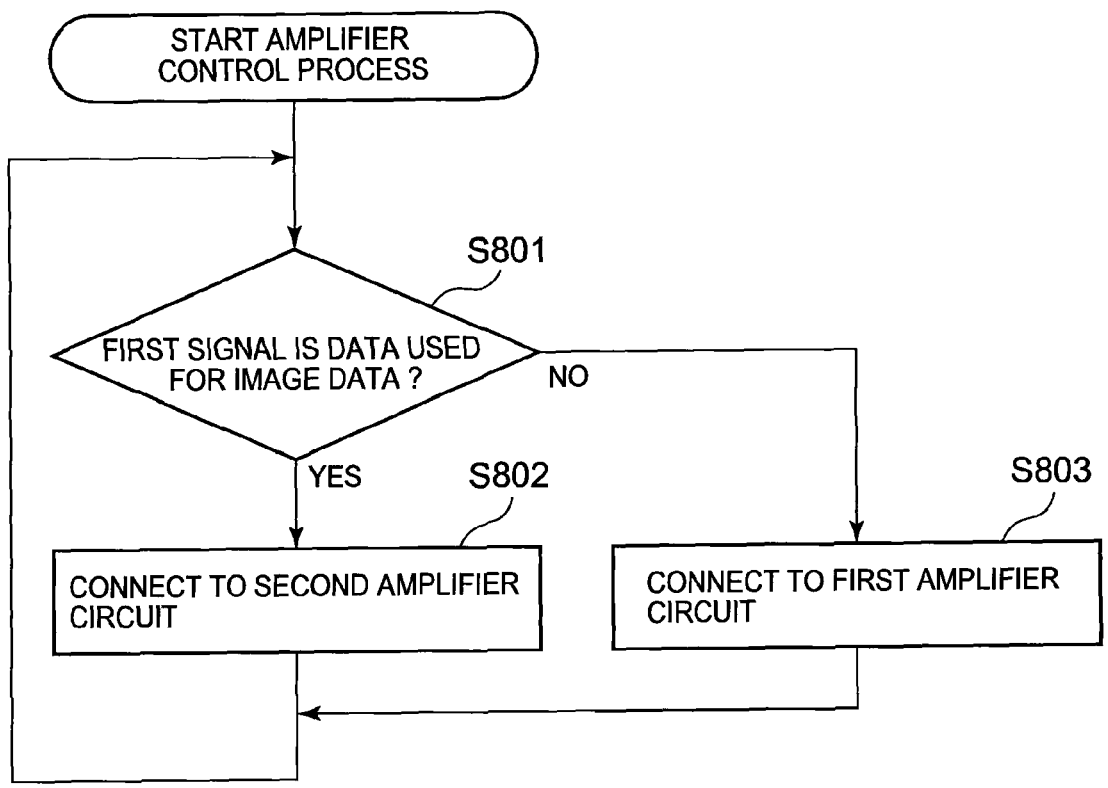
FIG. 8 is a flowchart showing an amplifier control process executed by the amplifier control device according to the embodiment of the present invention.

The control unit 10 changes a connection between the circuit and the resistor R1 or the resistor R2 using the switch element 902 through the same process as that of the flowchart of FIG. 8. That is, when the first signal is data used for image data, the control unit 10 (CPU 11) controls the switch element 902 to connect the resistor R2 to the circuit. Accordingly, a signal with a good frequency characteristic can be acquired from the amplifier 23 although the power consumption is large. When determining that the first signal is not data used for image data, the control unit 10 (CPU 11) controls the switch element 902 to connect the resistor R1 to the circuit. Accordingly, a second signal with poor frequency characteristic can be acquired from the amplifier 23 although the power consumption is little. Equal to or greater than three resistors may be provided, and the power consumption may be changed step by step. In this case, the control unit 10 sets how much the power consumption is reduced depending on a period that the first signal supplied from the image-pickup element 22 is data not used for image data. This may result in stabilization of the waveform in some cases. The resistance value can be changed using a variable resistor, not by switching the resistors.

The output signal by the CCD (having a resistor in an output unit) has a potential increased by the transistor 904. The output signal by the CCD is amplified (e.g., current amplification) by the emitter-follower circuit 901. Other operations are same as ones explained above.

Note that the structural elements shown in FIG. 1 are possessed by one amplifier control device 1. However, at least a part of the functions of the foregoing structural elements may be provided externally from the amplifier control device 1. For example, the display unit 50 (display device 51) may be an external device of the amplifier control device 1 (e.g., a monitor of a computer). Moreover, at least a part of the memory area of the memory unit 30 may be possessed by an external device (e.g., a server device). Furthermore, when the amplifier control device 1 is a computer, the image-pickup unit 20 may be an external device of the amplifier control device 1 (e.g., a camera).

The amplifier control program may be downloaded in a computer through a communication line like the Internet. In this case, the computer having downloaded the program functions as the amplifier control device 1. Moreover, the image processing program may cooperatively operate together with an OS (Operating System), and may cause the CPU 11 to execute the process. Furthermore, the amplifier control program may be recorded in various computer-readable memory medium (e.g., a RAM, a ROM, a CD-ROM (Compact Disk Read Only Memory), a DVD-ROM (Digital Versatile Disk Read Only Memory), a hard disk, or a flash memory). The image processing program is a computer-readable program, and a memory medium storing this program becomes a computer program product.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. An amplifier control device for controlling an amplifier which amplifies a first signal supplied from an image-pickup element and which supplies a second signal acquired by amplification of the first signal to a following-stage signal processing circuit, the amplifier control device comprising:
a control unit which switches between (i) changing a current supplied to the amplifier into a first value upon the amplification of the first signal supplied to the amplifier when the first signal is used for image data, and (ii) changing the current supplied to the amplifier into a second value smaller than the first value upon the amplification of the first signal supplied to the amplifier when the first signal is not used for image data.

2. The amplifier control device according to claim 1, wherein the control unit controls the image-pickup element to control a timing at which the image-pickup element supplies the first signal when the first signal is not used for image data, and changes a current supplied to the amplifier in accordance with the timing.

3. The amplifier control device according to claim 1, wherein the control unit changes the current supplied to the amplifier by changing a resistance value of the amplifier.

4. The amplifier control device according to claim 1, wherein the amplifier includes a plurality of amplifier circuits to which different currents are respectively supplied, and the control unit connects the image-pickup element and one of the plurality of amplifier circuits together depending on whether or not the first signal supplied to the amplifier is used for image data, thereby changing the current supplied to the amplifier.

5. The amplifier control device according to claim 1, wherein the first signal is not used for image data when the first signal is supplied from the image-pickup element during a period of horizontal flyback performed by the image-pickup element.

6. The amplifier control device according to claim 1, wherein the first signal is not used for image data when the first signal is supplied from the image-pickup element during a period of vertical flyback performed by the image-pickup element.

7. The amplifier control device according to claim 1, wherein the first signal is not used for image data when the first signal corresponds to an optical black pixel.

8. The amplifier control device according to claim 1, wherein the first signal is not used for image data when the first signal corresponds to a pixel not used for auto focusing.

9. The amplifier control device according to claim 1, wherein the first signal is not used for image data when the first signal is supplied from the image-pickup element during an exposure time of a digital image pickup.

10. A non-transitory computer readable recording medium having a program stored thereon, the program being executable by a computer to control an amplifier which amplifies a first signal supplied from an image-pickup element and which supplies a second signal acquired by amplification of the first signal to a following-stage signal processing circuit, the program controlling the computer to execute functions comprising:
    a process of switching between (i) changing a current supplied to the amplifier into a first value upon the amplification of the first signal supplied to the amplifier when the first signal is used for image data, and (ii) changing the current supplied to the amplifier into a second value smaller than the first value upon the amplification of the first signal supplied to the amplifier when the first signal is not used for image data.

* * * * *